United States Patent
Brooker et al.

[11] Patent Number: 5,723,221
[45] Date of Patent: Mar. 3, 1998

[54] ALUMINOUS PRESS PLATE AND PROCESS FOR PRODUCING SAME

[75] Inventors: Alan Thomas Brooker, Newcastle-upon-Tyre; Pascale Marie Elisabeth Cordiez, Cramlington, both of England

[73] Assignee: Formica Corporation, Cincinnati, Ohio

[21] Appl. No.: 639,189

[22] Filed: Apr. 26, 1996

[51] Int. Cl.⁶ .......................... B30B 15/06; B32B 15/04; C23C 8/00
[52] U.S. Cl. .......................... 428/469; 428/629; 100/295; 100/321
[58] Field of Search .......................... 100/295, 321; 428/629, 469, 472.2; 427/509

[56] References Cited

U.S. PATENT DOCUMENTS

| | | | |
|---|---|---|---|
| 3,661,074 | 5/1972 | Schweizer | 100/295 X |
| 5,244,375 | 9/1993 | Laurence et al. | 100/295 X |
| 5,555,799 | 9/1996 | Amick et al. | 100/151 X |

*Primary Examiner*—Daniel Zirker
*Attorney, Agent, or Firm*—Michael O. Warnecke; Richard A. Speer; Deborah S. Ruff

[57] ABSTRACT

A press plate for decorative laminate production has an aluminum alloy core plate exhibiting a 0.2% compressive yield stress of not less than about 180 MPa at 140° C., an aluminum cladding layer integrally bonded to opposing surfaces of the core plate, and a layer of aluminum oxide formed on the aluminous cladding which is substantially free of grain line effects.

17 Claims, 1 Drawing Sheet

ALUMINOUS PRESS PLATE AND PROCESS FOR PRODUCING SAME

BACKGROUND OF INVENTION

1. Field of the Invention

The present invention relates to laminated aluminum/aluminum alloy based press plates used in heat and pressure applications to manufacture decorative laminates and, more particularly, to an improved press plate comprised of an aluminous alloy core plate and an anodized buffed or textured aluminum cladding layer that enables the production of decorative laminates having high quality scratch, mar, scrape and abrasive wear resistant surfaces, and also to a method for manufacturing the press plates.

2. Description of the Prior Art

Decorative laminate manufacture and their uses are well known by those versed in the art. They are used extensively for many varied surfacing (and related structural) applications in the commercial, institutional and residential sectors, where pleasing aesthetics, durability, cleanability, and other unique properties are desired. For example, decorative laminates are particularly well suited for residential, institutional and office furniture, kitchen countertops, bathroom vanities, cabinets, wall paneling, doors, direct application flooring and computer room access floor tiles, computer work station and electronic component assembly station tops, laboratory bench tops, toilet partitions and many other applications where, besides their inherent decorative appeal, special enhanced properties such as postformability, fire retardency, wear resistance, electrostatic dissipativity, harsh chemical stain resistance, in-use abuse resistance and physical strength are required.

Decorative laminates can be conveniently divided into two general categories, viz. high pressure decorative laminate and low pressure decorative laminate, based on the distinctive and often unique compositions, processes, properties, and thus applications, of each type. High pressure decorative laminates are more suited to "high use and abuse" applications, particularly where "cold" bendability or heat induced postformability is needed, such as horizontal work and service surfaces, and floor tiles, where their generally superior wear resistance and impact resistance properties are beneficial. Low pressure decorative laminates are most useful for low wear and vertical surfacing applications, particularly where ease of fabrication and assembly are important considerations, such as cabinets and wall panels. However, such applications as noted above are not mutually exclusive in that, for example, high pressure decorative laminates are commonly used for cabinet faces and linings, and low pressure decorative laminates are commonly used for horizontal as well as vertical surfaces (and for structural support) in, for example, "knock down" and other low cost furniture. A particular article manufacturer may advantageously use both together, such as an office desk with a high pressure decorative laminate top and low pressure decorative laminate pedestals and modesty panel.

High pressure decorative laminates, as the name implies, are produced using relatively high pressures, usually 1,000 psig. or more in a heated flat bed hydraulic press, to achieve the requisite resin flow, cure and consolidation of the various composite layers (or laminae) into a unified laminated assembly. The laminate is typically comprised of a plurality of filler or core sheets (plies) most commonly composed of kraft paper impregnated with a phenol-formaldehyde thermosetting polymer (a.k.a. phenolic resin). The paper and/or phenolic resin used can be modified to impart specific desired properties to the final laminate. For example, the phenolic resin can be modified with a plasticizer to improve postformability, or either the kraft paper or phenolic resin can be modified with non-flammable salts or other additives to enhance fire retardency. In addition, other phenol based compounds and aldehydes may be used to alter the properties of the basic resin. On top of the filler plies are placed one or more decorative surface sheets, which are most commonly comprised of highly refined alpha-cellulose papers treated with a melamine-formaldehyde thermosetting polymer (a.k.a. melamine resin). Again, the papers and/or melamine resin can be modified to promote certain desired laminate properties. For example, the papers may contain a portion of cotton linter fibers or hard abrasive grit particles to improve postformability or wear resistance properties respectively; similarly the resin may be modified with plasticizers such as o,p-toluene sulfonamide or various glycols, or with abrasive grit, to also enhance postforming or wear properties respectively. In addition, other amines, such as acetoquanamine or urea may be advantageously used in the resin formulation, as can other aldehydes. Further, polyhydroxyl compounds, such as various sugars, have been used to modify the basic melamine resin, and a variety of catalysts (usually acids or acid generating salts such as organic or inorganic acid/amine salts) and press plate release agents (typically fatty acid salt types) are generally added to the melamine surface resin as well to improve processing and control final laminate properties. The laminate surface construction typically consists of a single ply of a pigmented and highly filled paper (with opacifiers such as $TiO_2$ and clay) in the case of solid color papers, or a ply of pigmented and filled paper on which is rotogravure or otherwise printed on its uppermost surface a pattern or design (commonly termed a "print sheet"), and over which is placed a light weight (40 g.s.m. or less) natural or tinted color low opacity paper to protect the print ink line (commonly termed an "overlay"), which when pressed, becomes essentially translucent thus allowing the pattern beneath to be visible, and forms the top most surface of the resultant laminate. In the case of solid colors, the top most surface of the laminate is usually the solid color decorative paper itself, although for special applications, an overlay may also be used in conjunction with it.

Conversely, low pressure decorative laminates are produced in a heated flat bed hydraulic press at significantly lower pressures of about 300 psig, and higher cure temperatures, generally using very short cycle times and hot discharge from the press thereafter. The core of the laminate, or substrate, usually consists of a single unified board, such as wood based particleboard or medium density fiberboard (MDF), although other types of boards, e.g. cement fiber board, may be used for specific applications. The surfaces of the board, typically particleboard or MDF board, are covered with one or more plies of melamine resin impregnated decorative papers. Normally, a single ply of solid color or print paper (without an overlay) is used to surface each face of the board, to "balance" the board and prevent the laminate from warping, although overlay and other combinations of surface papers may be used for specific purposes. The composition of the decorative surface papers are essentially the same as those for high pressure decorative laminates, although specific properties such as basis weight, porosity, density and pH may be altered somewhat to improve processing. The generic term "melamine resin" applies in much the same way as for high pressure decorative laminate, in as much as the basic resin may be modified with copolymers, plasticizers, catalysts, release agents, grit, and numerous other reactants and additives to improve laminate processing and/or its properties. Normally, the basic surface resin is the melamine resin type, although urea-formaldehyde resin, either discreetly, or in combination with the melamine resin, may be used to advantage. To facilitate resin flow and cure, and as such, bonding of the decorative sheets to the board during the very short, low pressure, high temperature press cycles normally employed, the surface resins are usually considerably more plasticized (as flow promoters) and catalyzed, than the high pressure decorative laminate counterparts. The short cycle times are desirable not only for productivity considerations, but to avoid excessive heating of the substrate board itself, which can cause blistering and even violent "explosion" of the board during pressure release and hot discharge from the press due to rapid volatilization of moisture trapped, until that point, within the board.

Those versed in the art will appreciate that the paper technology and resin chemistry associated with manufacture of high pressure and low pressure decorative laminates contained herein is not inclusive and exhaustive, but is intended only to be generally descriptive. Specific descriptions of the high pressure and low pressure decorative laminating processes, and the equipment employed in each, are discussed in more detail below.

The manufacture of decorative laminate has undergone a series of innovations which have led to greater and greater consumer expectations regarding decorative laminate durability and resistance to mar, scratch, scrape and abrasion damage. Efforts to produce such wear resistant decorative laminate, especially high pressure decorative laminate, have included a variety of means to produce a hard surface that resists degradation from physical abrasion, etc. For example, hard alumina grits of varying sizes have been incorporated within the laminate surface to improve product durability. However, the use of alumina grit to improve the wear resistance of decorative laminate, even in small grit sizes and concentrations, destroys the surface microfinish of conventional stainless steel press plates heretofore employed to fabricate decorative laminates.

The physical interaction of the formulation grit and the surface of the press plate causes microscratching and resulting lower gloss, haziness, "soft glow" high spot texture wear, and at times metal rub-off. Further, as the surface finish of the press plate imparts its overall surface finish to the final laminate product, for example, to form a high gloss or textured surface finish on the decorative laminate, substantial marring of the surface micro finish of the press plate renders the press plate unusable and often requires the damaged press plate to be refurbished at considerable expense or ultimately scrapped. Conventional buffed stainless steel press plates normally suffer unacceptably severe microscratching in as little use as just one press run with even relatively small size alumina grit. Textured stainless steel press plates are also easily microscratched by alumina grit. Although not as visually apparent as with highly buffed plates because of their generally much lower initial gloss level and inherent texture structure, the resultant gradual deterioration in gloss and texture erosion, particularly with use of larger grit sizes and concentrations, necessitates frequent refinishing.

Chrome plated steel press plates also suffer from severe microscratching after relatively few pressings. Chrome plating and post-baked electroless nickel deposition on stainless steel plates have been used, yet do not satisfactorily resolve the problems of grit-related microscratching and plate wear.

Further, buffing operations used for high gloss plates, or shot-blasting refinishing operations used for textured plates, tend to remove the thin plated layer unevenly, causing considerable cost to strip and re-plate the surface. The trend towards greater concentrations of even larger sized grit formulations only exacerbates these problems.

Press plates used to produce decorative laminates are somewhat unique in overall geometry. Heretofore manufactured principally from various grades of steel, particularly stainless steel, the press plate is a flat sheet of rectangular cross-section having comparatively large longitudinal and transverse dimensions, for example, as large as 20 feet and 8 feet respectively. While the press plates have opposing large planar surface areas, they are typically only about ⅛ of an inch thick, although they can vary in thickness from about 1/16 to ½ inch depending on their particular application.

When the press plate's planar surfaces are polished and then buffed to their final state, they ideally take on the appearance of a mirror-like sheet. To obtain this required finish, microscopic surface discontinuities and irregularities of any kind must be minimized. Minor imperfections in the surface of the press plates are transferred to the surface of the laminate during pressing and curing operations and, therefore, result in the production of inferior or unacceptable glossy finish laminate.

The terms polishing and buffing should be clarified, since there are often misunderstandings between the decorative laminating and metal surface finishing industries. Within the former, the two terms tend to be used synonymously, and it is not uncommon to refer to "polished" press plates, which have in fact been subsequently buffed to a mirror-like finish, for the manufacture of high gloss decorative laminates, with their descriptive finish names including "polished", "glossy", "luster" and "lacquer". However, within the metal surface finishing industry, there is a marked distinction between the two processes, as described in the American Society For Metals (ASM) Metals Handbook (Ninth Edition, Volume 5, Surface Cleaning, Finishing and Coating, 1982, pages 107–116). Polishing, typically with abrasive loaded endless cloth belts, is used to remove grinding lines, scratches, pits, bumps and other surface defects. Often a series of abrasive belts, proceeding from course grit to finer grits, are used, e.g. starting with 180 grit, and in sequence, followed by 240, 320, and finally 400 grit polishing in preparation for the final buffing operations.

After polishing to the desired smoothness, the surface can then be buffed, normally using cloth disk wheel or "mop" assemblies in conjunction with relatively fine abrasives, typically compounded in emulsified fatty acid "greases" or in solid, meltable waxes. There are two distinct types of buffing. In sequence, "hard buffing" with a fairly hard and rigid mop and moderately aggressive compound or "rouge" is first used to remove residual polishing marks and further smooth the surface. Finally, "color buffing", with a soft "floppy" mop and very fine rouge is used to remove marks remaining after the initial hard buff operation, resulting in a very smooth, scratch-free, high gloss mirror-like finish.

Textured press plates are produced by mechanically shot peening, mechanically embossing or chemically etching their planar surfaces, or combinations thereof, and are usually of much lower gloss than buffed press plates. The laminate gloss level is directly related to the gloss of the press plate from which it is produced. The greater the gloss of the plate, the greater the gloss of the resultant laminate finish, and the more apparent plate wear becomes on both.

In addition to being free of surface imperfections, the large planar surfaces used to impart a surface finish to a cellulose supported viscous resin matrix must be free from warpage to the maximum extent possible. Warpage generally takes two forms; the first is a regular bow appearing over the entire longitudinal or transverse dimension. At modest levels, this bow is tolerable so long as the press plate assumes a nearly perfect planar orientation under the pressure of the press. The second type of warpage manifests itself as localized distortions and buckling; the variations in the relative height of the press plate being from a hypothetically perfect planar surface. This second type of warpage is entirely objectionable as it often does not correct itself under the pressure of the press and thus frequently results in defective laminate appearance and scrapping of the press plate.

Thus, the level of manufacturing precision required to fabricate and maintain an overall defect-free macrofinish and microfinish, and warp-free surface, on both sides of the press plate, is critical. For example, for production of high pressure decorative laminates, press plates are generally used in a sandwich configuration with two composites of laminate resin-impregnated papers placed therebetween, facing opposite directions with the surfaces in contact with the plates. Multiple layers of interleaved laminate material and press plates, so called "packs" or "books", are then loaded into a press for thermal curing and pressure treatment consolidation. If either excess warpage of the first type or any warpage of the second type exists in the press plates, or if imperfections in the surface finish are present, significantly deleterious defects in the resultant decorative laminate appearance will be apparent.

OBJECTS OF THE INVENTION

Accordingly, it is an object of this invention to provide a hardened flat work piece, such as a press plate, for the economical production of wear resistant decorative laminates, where said decorative laminates exhibit improved resistance to scratch, mar, scrape and abrasion damage.

It is a further object of this invention to provide a press plate for the economical production of wear resistant decorative laminates having a high-quality microfinish of greatly extended press plate life.

It is also an object of this invention to provide a press plate free of objectionable warpage for the economical production of wear resistant decorative laminates.

It is another object of this invention to provide a method for producing an anodized aluminum press plate offering significantly greater wear life in the production of decorative laminates.

Other objects, advantages, and features of the present invention will be in part apparent and in part explained by reference to the following detailed description and appended claims, and by reference to the accompanying drawings.

SUMMARY OF INVENTION

The present invention involves an aluminum/aluminous alloy press plate for producing decorative laminate sheets within a decorative laminate press apparatus. The press plate comprises a substantially flat core plate which has opposed planar pressing surfaces of substantial area. The core plate is composed of an aluminum alloy which has a 0.2% compressive yield stress, or yield strength at 0.2% offset, of not less than about 180 MPa at 140° C. A suitable core plate composition may be selected from either the 2000 or 6000 series of aluminum alloys set forth in the American Society For Metals (ASM) "Metals Handbook®" Desk Edition (1985) pages 6.8–6.11. These aluminum alloys contain suitable amounts of alloying elements which deliver the necessary minimum compressive yield stress properties.

Integrally bonded to the planar surfaces of the core plate is a cladding of aluminum of not less then about 99% purity. Aluminum or aluminum alloys selected from the 1000 series set out in the reference text noted above are suitable for use. The purity of the aluminum cladding is significant because it makes possible achievement of a high gloss surface finish which is substantially free of visible defects, including indications of grain boundaries. Some of the core plate alloys suitable for use in this invention are more prone to develop grain line defects during anodizing than others, depending on the type and concentration of alloying elements comprising the specific alloy. The essentially pure aluminum cladding over the core plate alloy obviates the problem of grain line defects associated with any of the selected core plate alloys of this invention, and as such, allows a broader choice of alloys based on optimum desired mechanical properties. On the surface of the aluminum cladding there is provided, by means of an anodizing process, a continuous film of alumina ($Al_2O_3$) which has a thickness ranging up to about 50 microns. The alumina film is subsequently buffed by use of suitable buffing equipment and buffing compound or "rouge" to provide the desired mirror-like finish to the plate surface. The purity of the aluminum cladding is not as critical for textured plates, although selected 1000 series materials are still preferred. The relatively soft aluminum cladding, compared to the harder core plate alloy, facilitates mechanical embossing of a texture design into the plate surface. After the plate surface is textured by a suitable method, the surface is anodized as above.

The press plate of this invention is produced by providing an aluminum alloy based core plate having the necessary composition to achieve a 0.2% compressive yield stress of not less then about 180 MPa at 140° C., and then cladding the core plate with a layer of aluminum of not less then about 99% purity. Bonding of the aluminum layer to the core plate is accomplished by means of diffusion bonding, through the use of heat and pressure accompanying rolling of the mated materials. After the aluminum is diffusion bonded to the aluminum alloy base plate, and the plate surface subsequently prepared with the desired finish or texture, the cladding layer is oxidized, as by anodizing, to provide an integral film of alumina ranging up to about 50 microns in thickness, and preferably in the range of from about 10 to 50 microns in thickness.

BRIEF DESCRIPTION OF THE DRAWINGS

For a more complete understanding of this invention, reference is made to the accompanying drawings and following description. In the drawings.

DETAILED DESCRIPTION OF THE PREFERRED EMBODIMENT

Figure 1:
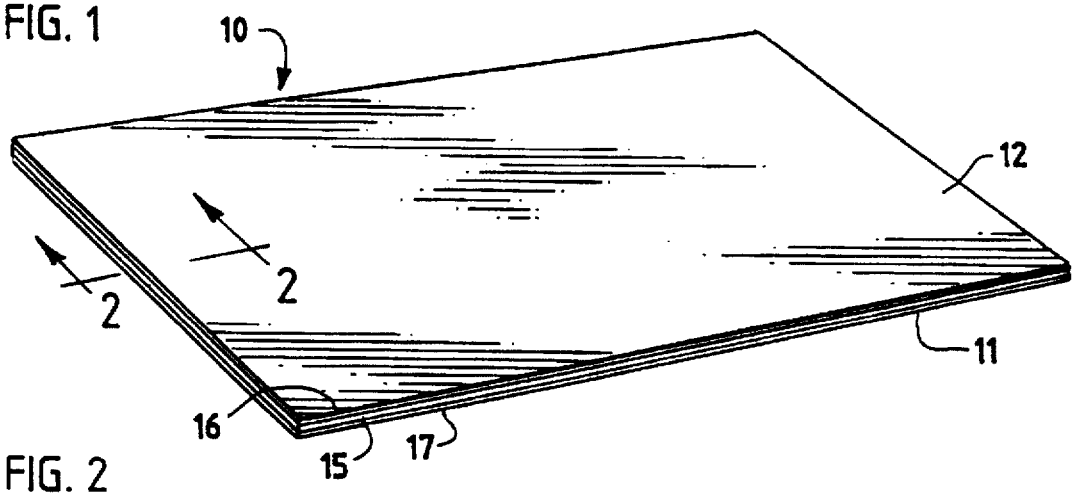
FIG. 1 is a perspective view of a typical press plate.
Figure 2:
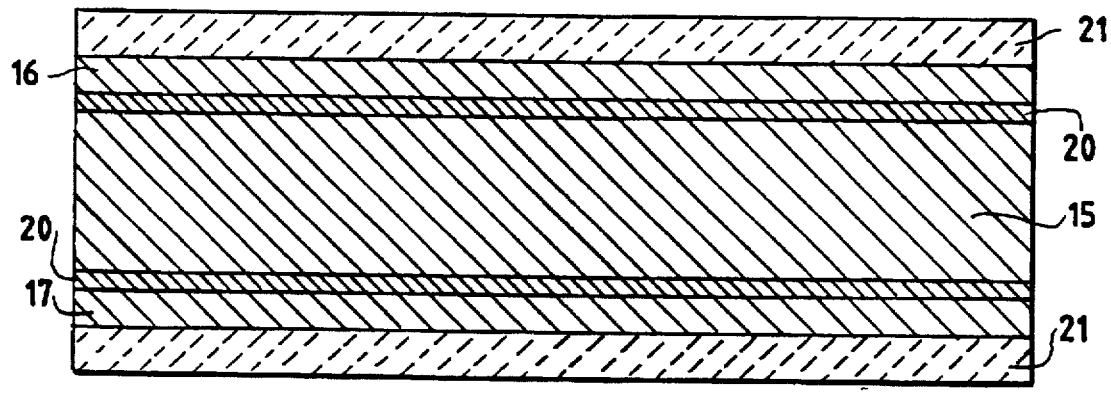
FIG. 2 is a sectional view taken along the line 2—2 of FIG. 1 through the alumina-aluminum-aluminous alloy-aluminum-alumina press plate composite of this invention.

Referring to FIG. 1 of the drawings, the press plate 10 of this invention is substantially rectangular in shape and has opposed planar pressing surfaces 11 and 12, which are of substantial area. The press plate comprises a number of individual layers, specifically a core plate 15 and upper and lower aluminum cladding layers 16 and 17, which form the exposed planar surfaces 11 and 12. Referring to FIG. 2 of the drawings, the substantially flat core plate 15 has opposed planar pressing surfaces of a substantial area, as mentioned earlier. The core plate must be composed of an aluminum alloy which exhibits a 0.2% compressive yield stress in excess of about 180 MPa at 140° C.

Alloys suitable for this purpose are those selected from the 2000 and 6000 series of alloys set forth in the ASM Metals Handbook® Desk Edition (1985). Such alloys include those shown below. Table I indicates their yield strength at 0.2% offset, i.e. 0.2% compressive yield stress, at various temperatures. Table II shows the nominal elemental composition of the alloys, recognizing that in practice, certain elemental concentration limits have been established for each alloy.

TABLE I

| Al ALLOY-TEMPER | YIELD STRENGTH (0.2% OFFSET) MPa | | |
|---|---|---|---|
| | 25° C. | 150° C. | 205° C. |
| 2014-T6 | 415 | 240 | 90 |
| 2024-T6 | 395 | 250 | 130 |
| 2024-T81 | 450 | 340 | 140 |
| 2219-T81 | 345 | 275 | 200 |
| 2618-T61 | 370 | 305 | 180 |
| 6061-T6 | 275 | 215 | 105 |

TABLE II

| | COMPOSITION, WT. % (NOMINAL) | | | | | | | | |
|---|---|---|---|---|---|---|---|---|---|
| | Si | Cu | Mn | Mg | Cr | Zn | Fe | Other | Al |
| Al ALLOY | | | | | | | | | |
| 2014 | 0.8 | 4.4 | 0.8 | 0.5 | — | — | — | — | 93.5 |
| 2024 | — | 4.4 | 0.6 | 1.5 | — | — | — | — | 93.5 |
| 2219 | — | 6.3 | 0.3 | — | — | — | — | — | 93.4 |
| 2618 | 0.2 | 2.3 | — | 1.6 | — | — | — | — | 95.9 |
| 6061 | 0.6 | — | 0.3 | 1.0 | 0.2 | — | — | — | 97.9 |
| Unalloyed Al | | | | | | | | | |
| 1050 | <0.25 | <0.05 | <0.05 | <0.05 | — | — | <0.40 | <0.11 | >99.50 |

The 2000 and 6000 series aluminum alloys are heat treatable wrought aluminum alloys. Copper is the major alloying element for the 2000 series alloys, while magnesium and silicon are the major alloying elements of the series alloys. In general, the 2000 series alloys possess higher yield strengths than do the 6000 series alloys, and are therefore preferred for use in this invention in terms of press plate strength and dimensional stability. However, the 2000 series alloys, because of their high copper content, are more prone to develop grain boundary defects during the electrolytic anodizing process, thus in particular requiring the essentially pure aluminum cladding anodizing layer on the core plates comprised of these alloys to eliminate such grain line defects in accordance with this invention.

It should be understood that aluminum alloys suitable for use as core plates in accordance with this invention are not limited to those listed in Table I and Table II above, and that not all the 2000 and 6000 series alloys are suitable, since some do not meet the minimum yield strength requirement of 180 MPa at 140° C. Besides the alloy itself, the other important consideration in determining the yield strength of these heat treatable alloys is the type of tempering. The alloy suffix designation for a stable temper is "T" followed by one or more numbers indicative of the specific treatment sequence. In general, the larger the first number, the greater the yield strength, with tempers T6 (solution heat treated and artificially aged) and T8 (solution heat treated, cold worked and artificially aged) preferred, where such tempering substantially improves the alloys mechanical properties and dimensional stability by precipitation heat treatment. None of the 2000 or 6000 series alloys with an "O" temper designation, indicating they have only been annealed and not heat treated, are suitable for use in this invention, having very low yield strengths, i.e., normally less than 100 MPa at 25° C. Yield strength normally decreases with increased temperature, such that any alloy with a yield strength of at least 180 MPa at 150° C., as shown in Table I, will have an even greater yield strength at 140° C., thus meeting or surpassing the critical value criterion of this invention. A preferred tempered aluminum alloy for use with this invention is 2014-T6, because of its requisite physical properties, easy availability from aerospace industry applications, and cost.

Table III below illustrates the effect of tempering on the yield strength of an alloy. Of the three 6061 alloy materials, only that with the T6 temper is suitable in the practice of this invention.

TABLE III

| | Yield Strength (MPa) | |
|---|---|---|
| Alloy-Temper | 25° C. | 150° C. |
| 6061-O | 55 | N/A |
| 6061-T4 | 145 | N/A |
| 6061-T6 | 275 | 215 |

Therefore, alloys such as 2014-T6, 2024-T6, 2024-T81 and 6061-T6 are specific tempered alloys in the 2000 and 6000 series which are suitable for use in manufacture of a press plate according to this invention. Specific tempered alloys within these classes possess the dimensional stability that is necessary for use in press plates. Dimensionally, these tempered alloys exhibit no measurable shrinkage, creep or warpage with continued use under the conditions of a typical high pressure decorative laminating process, i.e., press plates with a nominal ⅛ inch thickness and temperatures of 125°–150° C. at pressures of 1,000 to 1,600 psig (7.0 to 11.2 MPa) with repeated heating and cooling cycling.

With a typical low pressure decorative laminate pressing process, using a single opening "short cycle" press system, processing temperatures are considerably higher, usually in the range 170° C. to 190° C. However, in general, the alloys that are suitable at the lower high pressure laminating temperatures are also suitable at the higher low pressure laminating temperatures, although some variation in plate geometry, such as increased thickness, might be advantageous for optimum results. In addition, specific alloys can be selected from the 2000 alloy class that exhibit the required physical properties even at these elevated temperatures. As can be seen in Table I, yield strength for some of the alloys selected as suitable for high pressure laminate press plates will fall below the critical value of 180 MPa at temperatures above 150° C. and approaching those used in the low pressure laminating process. However, these alloys are still generally suitable for use as core plates of this invention because of inherent differences in the plate dimensions and processing method compared to a typical high pressure laminate pressing process. Normally, low pressure press plates are fixed to the upper and lower heating platens in the press. The platens and plates are under heated isothermal conditions, without the repeated heating and cooling cycles associated with a high pressure laminating process. As such, induced stresses related to repeated thermal expansion and contraction of the press plates, laterally restrained under the high specific pressure generated in a high pressure press, are avoided. In addition, since heat transfer efficiency needed during the heating/cooling cycles is not a consideration, or is daylight clearance, the low pressure press plates are generally thicker than high pressure press plates, typically in the range of ¼ inch to ½ inch. While the increased thickness of low pressure process plates does not significantly increase their yield strength per se, the thicker press plates are inherently more dimensionally stable and less prone to warpage. As can also be seen in Table I, there are specific 2000 series tempered aluminum alloys that retain their yield strength above the 180 MPa critical value even at the higher low pressure laminating press temperatures, such as, for example, alloys 2219-T81 and 2618-T61.

Integrally bonded to the opposing planar surfaces of core plate 15 are thin cladding layers 16 and 17 of aluminum of not less then about 99% purity. Alloys suitable for use as cladding are the aluminum alloy types from the 1000 series, for example, alloy types 1070, 1050, and 1030. Optimally, the cladding layer should be thin and not show any appreciable grain line affects after being subsequently oxidized. Preferably, the aluminum layer should be within the range of from about 50 to 100 microns in thickness. Cladding layers with thicknesses outside the preferred range can be used but are not recommended. The aluminum cladding layer must be thick enough to accommodate polishing and buffing, or texturizing, of the layer prior to anodizing, and to afterwards obtain the desired, optimum anodized surface layer thickness, but not be too thick such that after anodizing, a soft, ductile interface remains between the anodized layer and the underlying alloy core plate, which would deleteriously affect plate properties.

As mentioned above, the thin aluminum cladding layers 16 and 17 are integrally bonded to the core plate 15 and is preferably effected by the creation of a diffusion layer 20, which is achieved by the application of heat and pressure to the composite. This intermediate diffusion layer consists of a decreasing aluminum rich gradient extending from the back of the aluminum cladding into the alloy core, and as such, there is no distinct bonding interface between the aluminum cladding surface layer and the aluminum alloy substrate, as would be the case, for example, if an aluminum foil were chemically adhered to a substrate. For example, the diffusion bonding of the cladding layers 16 and 17 to the core 15 can be accomplished at the mill, where typically a thick slab of aluminum alloy is sandwiched between two thinner, essentially pure aluminum plates or sheets, and the assembled materials simultaneously hot rolled to produce a double sided aluminum clad aluminum alloy plate of the desired final thickness, coiled, and subsequently sheeted and heat treated to temper the alloy core. The aluminum alloy slab will typically comprise about 93% to 97% of the total thickness and mass of the assembly, and each of the pure aluminum plates about 1.5% to 3.5% of the total assembly thickness and mass, to produce a final 3 mm thick plate with about a 50 to 100 micron thick aluminum cladding on each face.

Following bonding of the aluminum cladding to the core plate, and afterward, preparing the surface with the desired texture and finish, the cladded plate is then oxidized to develop a continuous film of alumina ($Al_2O_3$) 21 up to about 50 microns in thickness. The oxidation is advantageously effected by utilizing a hard anodizing process, which will develop a hard, nonporous film that resists grit related microscratch and other superficial scratch and burnish damage. Anodization of cladding layers 16 and 17 should be conducted under operating conditions and times sufficient to develop an alumina layer of thickness preferably ranging from about 10 to 50 microns. That the film thickness be in this range is important for two reasons. The rates of thermal expansion and contraction of the alumina surface layer and metallic aluminum core during a press heating/cooling cycle are different, subjecting the surface to stresses. In addition, during the routine mechanical handling of the plates between cycles, using vacuum hoists and possibly conveyors, there is a certain amount of plate flexing that occurs, which can strain the relatively brittle anodized surface layer. It has been found that thicknesses within the above range prevent cracking or crazing of the oxide layer which might otherwise result from mechanical handling and thermal cycling taking place during press operations. Anodic layers with thicknesses outside the preferred range can be used but are not recommended. Thicker layers are more prone to fracture failure, while thinner layers do not provide the desired plate surface properties in terms of hardness, microscratch resistance and refinishing life. Following anodizing to produce the protective film of aluminum oxide, the oxide film can then be buffed with a suitable buffing agent, such as rouge, to deliver a glossy plate substantially free of any surface defects, so that the plate is capable of preparing high quality glossy finish laminates. Alternately, the desired gloss level of anodized textured plates can be best established by adjusting the gloss of the textured aluminum cladding prior to anodizing by a suitable process such as chemical etching to reduce gloss, or chemical polishing to increase gloss.

Figure 3:
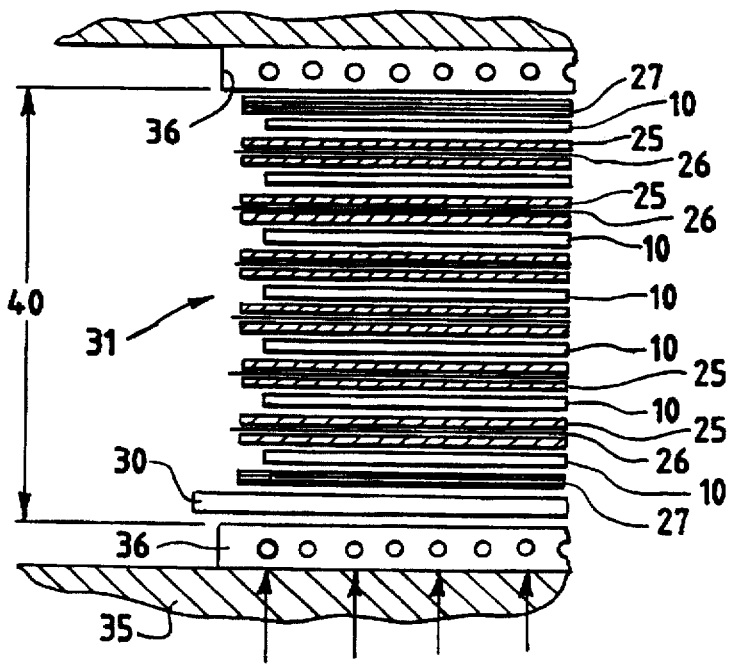
FIG. 3 is a side elevation of a portion of a representative high pressure flat bed press and pack assembly, utilizing the press plates according to the present invention.

High pressure decorative laminates produced using press plates according to this invention may be made utilizing the apparatus shown in FIG. 3, in which press plates are used with composites of laminate resin impregnated treated papers placed therebetween, facing opposite directions. A plate thickness of 0.100 to 0.125 inch (2.5 to 3.2 mm) is preferred. In FIG. 3, multiple layers of press plates 10, laminate material 25, separator sheets 26 and cushions 27 are placed on carrier trays or "pans" 30 to form "packs" 31, which are then loaded into a press 35 between heating/cooling platens 36 for temperature and pressure treatment consolidation and curing. Note that as the clearance for material movement into the press 35 between the heating/cooling platens 36 is limited by the press opening or "daylight" 40, i.e., the space between the two platens when the press 35 is fully open, it is apparent from FIG. 3 that excess plate warpage of the first type can interfere with the ability to move the pack 31 into the press 35.

After a cure period of about 45 to 90 minutes, typically at temperatures of 125° C. to 150° C. and pressures of 1,000 to 1,600 psig (7.0 to 11.2 MPa), with subsequent cooling and unloading of the press, varying levels of physical effort are necessary to disassemble the pack 31 into its press plate and finished laminate constituent parts. For example, the releasability of textured plates has been found generally to be less than that of glossy buffed plates. Further, "picking", or small deposits of resin and fibrous material remaining on the press plate 10 after separation from the laminate, can occur, with transfer to and contamination of the surface of subsequently pressed laminate from the same press plate 10. In the worst case, the entire laminate sheet can become physically bonded to the press plate 10 causing serious plate refinishing problems.

A recent development in the conventional high pressure decorative laminate process, which normally employs a multi-opening press, typically with 12 to 24 or more daylights and pack assemblies consisting of 7 to 9 plates and 12 to 18 laminates each, using processing conditions previously described, is the concept of a "quick cycle" pressing operation. Press plates of this invention are applicable to this modified high pressure decorative laminating process as well, in which the press capacity is generally limited to 4 to 6 openings, with packs usually comprising only 3 to 4 plates and 4 to 8 laminates each, employing a relatively short 15 to 30 minute heating and cooling thermal cycle time using essentially the same temperature and pressure curing conditions as with the conventional large press high pressure decorative laminate process. The advantages of the "quick cycle" process are generally recognized in the industry to be reduced press plate investment and increased press scheduling flexibility, albeit with some compromise in press capacity. An even more recent development for the manufacture of high pressure decorative laminates is the use of a single opening "short cycle" press, in which a pair of laminates is pressed between plates fixed to the upper and lower heating platens, typically using a one to two minute curing cycle with hot discharge thereafter, usually to a secondary "press" for cooling. The press plates of this invention can be used with this isothermal process with beneficial results for reasons previously discussed. This process is similar to that for low pressure decorative laminates, except that lower temperatures and higher pressures typical of a conventional high pressure decorative laminating process are utilized. Such a process has the main benefit of minimizing press plate investment.

Press plates according to this invention may also be used to produce low pressure decorative laminates, such as those containing a particleboard or medium density fiberboard substrate rather than a plurality of phenolic resin impregnated cellulosic core sheets of the high pressure decorative laminate type, and surfaced with a treated print or solid color sheet, and optionally, an overlay sheet as well. Low pressure decorative laminates are most commonly produced in a single opening hot discharge press, where a press plate is fixed to each of the two isothermally heated press platens. In contrast to the cure period of about 45 to 90 minutes at temperatures of about 125° C. to 150° C. and pressures ranging from 1,000 to 1,600 psig. (7.0 to 11.2 MPa) for pressing high pressure decorative laminate, low pressure decorative laminates typically have cycle times of about 30 seconds to 1 minute at pressures of about 200 to 300 psig (1.4 to 2.1 MPa) at temperatures of about 170° C. to 190° C. The use of grit materials in the laminate surface with the rapid cycle rates used to produce low pressure decorative laminates normally will quickly deteriorate the press plates of such applications. Therefore, the utility of the present invention should be applicable to a wide range of decorative laminate products and processes.

In addition to visual examination of a press plate to determine its surface finish quality, the surface finish of the laminate manufactured by the press plate can also be used to determine the press plate surface finish quality. ISO 60 degree gloss measurements are commonly used to characterize laminate finishes. Textured finish laminates are commonly produced with a variety of gloss levels. As the marketplace has become much more critical in recent years, haze-free high gloss laminate surfaces with improved wear properties are also now demanded. As such, the scale shown in Table IV below is generally accepted in the industry to categorize the quality of a high gloss laminate finish:

TABLE IV

| Laminate Gloss | Finish Quality |
| --- | --- |
| (ISO 60°) | |
| >110 | excellent |
| 100–110 | good–very good |
| 95–100 | acceptable |
| <95 | unacceptable |

Laminate gloss is usually measured with a 60° gloss meter, of which many makes and models are readily available, and all of which generally work on the same principle. A beam of calibrated intensity light is projected onto the surface of the laminate at an angle 60° to normal of the laminate surface (i.e., an incidence angle of 30° from the plane of the laminate surface). Geometrically opposite to the light source is a photodetector device which measures the intensity of the light beam reflected from the laminate, which is then transposed by the meter into a gloss value (either in analogue or more commonly nowadays, digital form).

The gloss meter is initially calibrated against a high gloss black tile standard with a known gloss value (usually 94±1 gloss units or degrees) supplied with the meter. The ISO (International Standards Organization) method stipulates that the gloss meter be calibrated to agree precisely with the gloss value of the black tile standard. It must be understood by those skilled in the art that several factors influence the relative gloss of a laminate finish, the most important of which are the microtexture (degree of buffing or shot peen overblasting) and macrotexture (structure) of the plate surface from which it was pressed against, which have confounding effects on the gloss level measured by a meter.

Except for a perfect mirror finish, some quantity of light intensity is lost from the meter's light source through reflection to the photodetector because of light scattering caused by non-planar irregularities on the plate surface. The irregularities can be present on a nanometer (nm) scale with respect to a plate surface's "microfinish", as well as on a micron (µm) or even millimeter (mm) scale when related to a plate macrotexture structure's roughness and topography (i.e., peaks and valleys with etched or embossed plates, or in the case of a peened plate surface, ridges and craters, respectively). All of these disruptions scatter some amount of light and reduce the perceived gloss level of the finish, both instrumentally and visually, although both "measurements" are not necessarily always in total agreement. In general, the greater the microtexture and macrotexture of the surface finish, the more light will be scattered and the lower will be its measured and perceived gloss level.

The following examples illustrate the advantages of the anodized aluminum press plates of this invention.

EXAMPLE 1

A full size 4 ft.×10 ft. test plate, comprising a 2014-T6 aluminum alloy core plate approximately 3.0 mm (0.118 inch) thick with a 65 micron thick cladding on both sides of 1050 aluminum was first buffed to remove minor surface imperfections, and then hard anodized to develop an oxide film with a measurable thickness of about 30 microns. The plate was subsequently buffed to a high gloss mirror finish. This plate was then used in the production of 100 high pressure decorative laminate pressings. During this trial, quick release and easy separation of the mated test plate and laminates was obtained, with no observable picking residue on the plate. After the initial trial of 100 pressings, it was found that the dimensions of the press plate had not changed, that it was not at all warped, and that the gloss remained good. This plate was subsequently pressed for more than 1000 additional cycles to produce a variety of high pressure laminate products without encountering any warpage or deterioration of the anodized surface layer (stress fractures, crazing, etc.) or gloss level.

EXAMPLE 2

An identical plate as in Example 1 was used to produce glossy finish laminate for 200 pressings. The laminate surface contained 9 micron diameter alumina grit at a concentration of 1.0 to 1.5 g.s.m. (equivalent to about 0.7 to 1.1% grit by weight in the liquid melamine surface resin). Gloss readings on the laminate surface were periodically taken during the trial, with the following results:

TABLE V

| Pressing No. | Gloss* | Pressing No. | Gloss* |
| --- | --- | --- | --- |
| 1 | 108.5 | 86 | 104.3 |
| 9 | 107.1 | 94 | 102.4 |
| 18 | 106.8 | 104 | 102.8 |
| 28 | 107.3 | 114 | 105.7 |
| 38 | 105.7 | 123 | 106.2 |
| 47 | 106.6 | 133 | 106.5 |
| 57 | 99.7 | 152 | 106.3 |
| 66 | 103.9 | 173 | 105.6 |
| 76 | 100.3 | 191 | 105.2 |

*Dr. Lange ISO 60° gloss meter with 93 gloss unit calibration tile. Average of three readings.

The plate remained perfectly flat throughout the trial. After the trial, visual inspection of the plate indicated no alteration of the surface finish or any grit induced microscratching. Conversely, it is well known in the art that conventional glossy stainless steel press plates are extremely susceptible to grit related microscratching, even by relatively fine particles at low concentrations in the laminate surface. Specifically, U.S. Pat. No. 5,244,375 (Laurence, et al. 1993) discloses that when pressed against laminates whose decorative surface paper was treated with melamine resin containing 1% on liquid weight 6 micron diameter alumina grit, a standard A.I.S.I. 410 stainless steel glossy press plate is severely microscratched to a commercially unacceptable finish condition after only a single pressing, and that "protection" of an A.I.S.I. 410 stainless steel glossy plate with a hard chrome plating extends the usable life to only 8 pressings before commercially unacceptable microscratching occurs. Significantly, the 9 micron diameter alumina grit containing laminate surface used against the trial anodized aluminum plate of this invention should be even more aggressive and harmful to a glossy plate finish. A glossy finish plate is the most critical test of a plate's surface hardness and microscratch resistance compared to a lower gloss textured plate.

The above described embodiments are merely illustrative of the principles of this invention. Other arrangements and advantages may be devised by those skilled in the art without departing from the spirit and scope of the invention. For example, the anodized aluminum plates described herein could advantageously be used in applications other than production of decorative laminates where enhanced aluminum "caul plate" hardness and wear resistance is desirable, such as in the manufacture of fiberboard, particleboard, hardboard and plywood sheet products. Accordingly, the invention should be deemed not to be limited to the above detailed description and applications, but only by the spirit and scope of the claims which follow.

What is claimed is:

1. An aluminous press plate for producing decorative laminates from decorative laminate materials, in a press apparatus, said plate comprising:
   (a) a substantially flat core plate having opposed planar pressing surfaces of substantial area, the core plate being composed of an aluminum alloy having a 0.2% compressive yield stress of not less than about 180 MPa at 140° C.;
   (b) a thin cladding layer of aluminum of not less than about 99% purity integrally bonded to the opposed planar surfaces of the core plate; and
   (c) a continuous film of aluminum oxide on the aluminum cladding, the $Al_2O_3$ film being substantially free of grain line effects and substantially defining a surface finish of the decorative laminate.

2. An aluminous press plate as defined in claim 1 wherein the core plate has a composition selected from the 2000 or 6000 series of aluminum alloys.

3. An aluminous press plate as defined in claim 1 wherein the cladding layer has a composition selected from the 1000 series of aluminum alloys.

4. An aluminous press plate as defined in claim 1 wherein the thin cladding layer of aluminum has a thickness selected from the range of about 50 to 100 microns.

5. An aluminous press plate as defined in claim 1 or 4 wherein the outermost non-bonded surface of the thin cladding layer is polished and buffed or textured.

6. An aluminous press plate as defined in claim 1 wherein the aluminum oxide film on the aluminum cladding has a thickness of up to about 50 microns.

7. An aluminous press plate as defined in claim 1 wherein the aluminum oxide film on the aluminum cladding has a high gloss buffed finish.

8. An aluminous press plate as defined in claim 4 wherein the thin cladding layer is diffusion bonded to the core plate.

9. An aluminous press plate as defined in any one of the preceding claims in which the film of $Al_2O_3$ has a thickness selected from the range of about 10 to 50 microns.

10. An aluminous press plate as defined in claim 9 wherein the thickness of the film of $Al_2O_3$ about 30 microns.

11. A press apparatus for producing decorative laminate sheets comprising:
   (a) means for supporting resinous mixtures and substrate materials as a substantially planar layer;
   (b) an aluminous press plate having
      (i) a core of an aluminum alloy having a 0.2% compressive yield stress of not less than about 180 MPa at 140° C.,
      (ii) a thin cladding layer of aluminum of not less than about 99% purity integrally bonded to the opposed planar surfaces of the core, and
      (iii) a continuous film of $Al_2O_3$ having a thickness of up to about 50 microns on the aluminum cladding, the $Al_2O_3$ film being substantially free to grain line effects; and
   (c) means to urge the $Al_2O_3$ film against the resinous mixture and substrate material to form a generally planar laminate sheet.

12. A press plate as defined in claim 11 wherein the thickness of the aluminum cladding is selected from the range of about 50 to 100 microns.

13. A press plate as defined in claim 11 wherein the thickness of the $Al_2O_3$ film is selected from the range of about 10 to 50 microns.

14. A process for producing an aluminous press plate for producing decorative laminate sheets, the steps comprising:
   (a) providing a aluminous core plate having opposed planar pressing surfaces of substantial area, which core plate is composed of an aluminum alloy having a 0.2% compressive yield stress of not less than about 180 MPa at 140° C.;
   (b) diffusion bonding a thin cladding layer of aluminum of not less than about 99% purity to the planar surfaces of the core; and
   (c) oxidizing the thin cladding layer to form a film of $Al_2O_3$.

15. The process as defined in claim 14 including the step of texturing or finishing by polishing and buffing the surface of the thin cladding layer prior to oxidizing.

16. A process as defined in claim 14 wherein the oxidizing of the thin cladding is conducted under conditions to form a $Al_2O_3$ film having a thickness within the range of from about 10 to 50 microns.

17. The process as defined in claim 14 wherein the $Al_2O_3$ layer is buffed to a high luster mirror-like finish.

* * * * *